United States Patent [19]

Kuo

[11] Patent Number: 4,511,765
[45] Date of Patent: Apr. 16, 1985

[54] UNIVERSAL CONTROL DEVICE FOR RESTRICTING DIALING AND TIME LIMITING TELEPHONE CALLS

[75] Inventor: Calven Kuo, Taipei, Taiwan

[73] Assignee: Aurora Mechatronics Corporation, Taipei, Taiwan

[21] Appl. No.: 493,591

[22] Filed: May 11, 1983

[51] Int. Cl.³ .................. H04M 1/26; H04M 1/66
[52] U.S. Cl. ..................... 179/90 BD; 179/2 TC; 179/18 DA
[58] Field of Search .............. 179/7.1 R, 2 A, 2 TC, 179/90 BD, 81 R, 84, 90 D, 18 DA, 189 R

[56] References Cited

U.S. PATENT DOCUMENTS

| | | | |
|---|---|---|---|
| 3,702,903 | 11/1972 | Barton | 179/18 DA |
| 4,012,602 | 3/1977 | Jackson | 179/18 DA |
| 4,473,718 | 9/1984 | Ettel | 179/2 TC |
| 4,475,013 | 10/1984 | Lee et al. | 179/90 BD |

Primary Examiner—Stafford D. Schreyer
Attorney, Agent, or Firm—Cushman, Darby & Cushman

[57] ABSTRACT

A telephone set control device. A dialing signal is converted into a pulse signal through a converter circuit; then, a pulse detection circuit generates a constant wavewidth signal to be coupled to a microprocessor unit, which then generates a signal, by means of the program instruction set in a read-only memory and A/D-latch circuits to operate a converter circuit to cut off the telephone connection at the end of a pre-programmed time period. The device enables the telephone owner to preselect the talking time and the number of digits to be dialed. The talking time and the number of digits which may be dialed are set in advance via a selective switch control means so as to let the user dial only the number of digits preselected and talk for only the period of time set; thereby saving time and preventing others from dialing unauthorized numbers.

6 Claims, 2 Drawing Figures

UNIVERSAL CONTROL DEVICE FOR RESTRICTING DIALING AND TIME LIMITING TELEPHONE CALLS

BACKGROUND OF THE INVENTION

Since a science has made a considerable progress, various industries have also followed the suit. Particularly, the tele-communication industry has advanced a long stride. In recent years, not only the domestic trunk call can be dialed directly, but also the international trunk call can also be dialed directly. It is rather convenient to the user, but it also raises a lot of annoyances; for instance, (1) when making a domestic trunk call or international trunk call, some money may have been un-necessarily spent because of an inability to shorten the conversation time; (2) some persons often make international trunk calls by using another's telephone set, and that is difficult to prevent. Now, although there are many trunk call control units to be used on the telephone set, their results are still far from being satisfastory because the control units can only control the digit "0" or "1". One who wants to make use of another's telephone can still call thru by dialing an adjacent zone digit first. That conventional trunk call control unit is quite different from the present invention, which uses a micro processor unit to optionally set the number of dialing digits and the talking time.

SUMMARY OF THE INVENTION

The present invention, a universal control device for telephone set, is aimed to eliminate the drawbacks in the conventional telephone set control unit. The present invention not only can be pre-set with a given conversation time on the telephone, but also can be pre-set with a given number of digits to be dialed in accordance with the owner's requirement so as to limit the user's international trunk call, the city area telephone call or emergency call or time calibration call, etc. if so desired.

DETAILED DESCRIPTION

Figure 1:
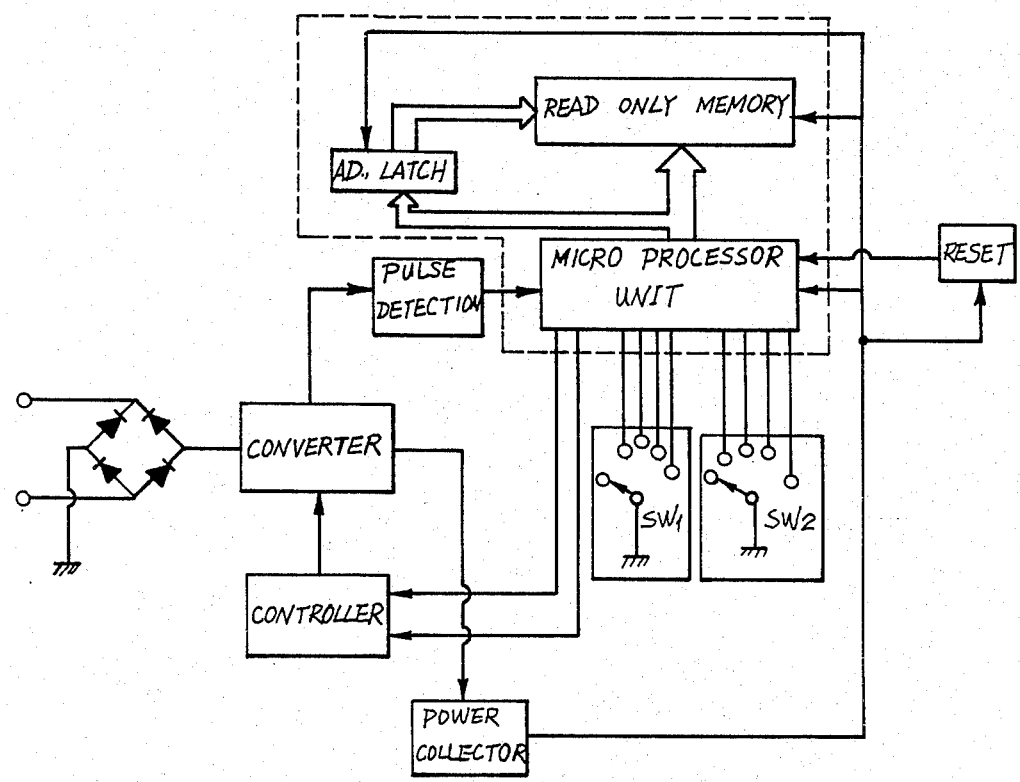
FIG. 1 is a block diagram of the embodiment in the present invention.

The power supply of the present invention is furnished with telephone set power supply which is connected thru a bridge rectifier and a converter circuit as shown in FIG. 1. Since the IC's used in the present invention are all a special type, the power consumption is small and stable, and the telephone set operation will not be affected during dialing or talking. The converter circuit 1 can provide three functions, i.e., (1) to convert the dialing signal into a pulse which is then coupled to the pulse detection circuit, (2) to convert the power for the power collector, (3) to receive the control signal from the controller circuit for controlling the telephone set.

The pulse detection circuit 2 can receive the telephone set signal from the converter circuit, and can have the signal decoded and delivered into the micro processor unit 3.

The micro processor unit can generate instruction control for the decoded signal, the time set, and the dialing number.

The read only memory 4 can store the software program of the micro processor unit, and can also receive instructions from the said processor unit, and also can execute the software work of said processor unit.

The AD. latch 5 can, upon the micro processor unit delevering an ouput signal, have $IC_3$ (Read-only Mmeory, see FIG. 2.) deliver software information to the processor unit for accomplishing the instruction work of the processor unit.

Controller Circuit 6: Upon receiving an execution instruction, the micro porcessor unit makes "Yes" or "no" decisions by means of a an output of warning signal; then, the micro processor unit generates and delivers a cut-off instruction thru the controller circuit to control the converter circuit 1, i.e. to have it become open (off state).

Power collector circuit 7: After the power is converted by the converter circuit, the power is sent to the power collector circuit 7 so as to provide the present invention with a stable power supply.

Figure 2:
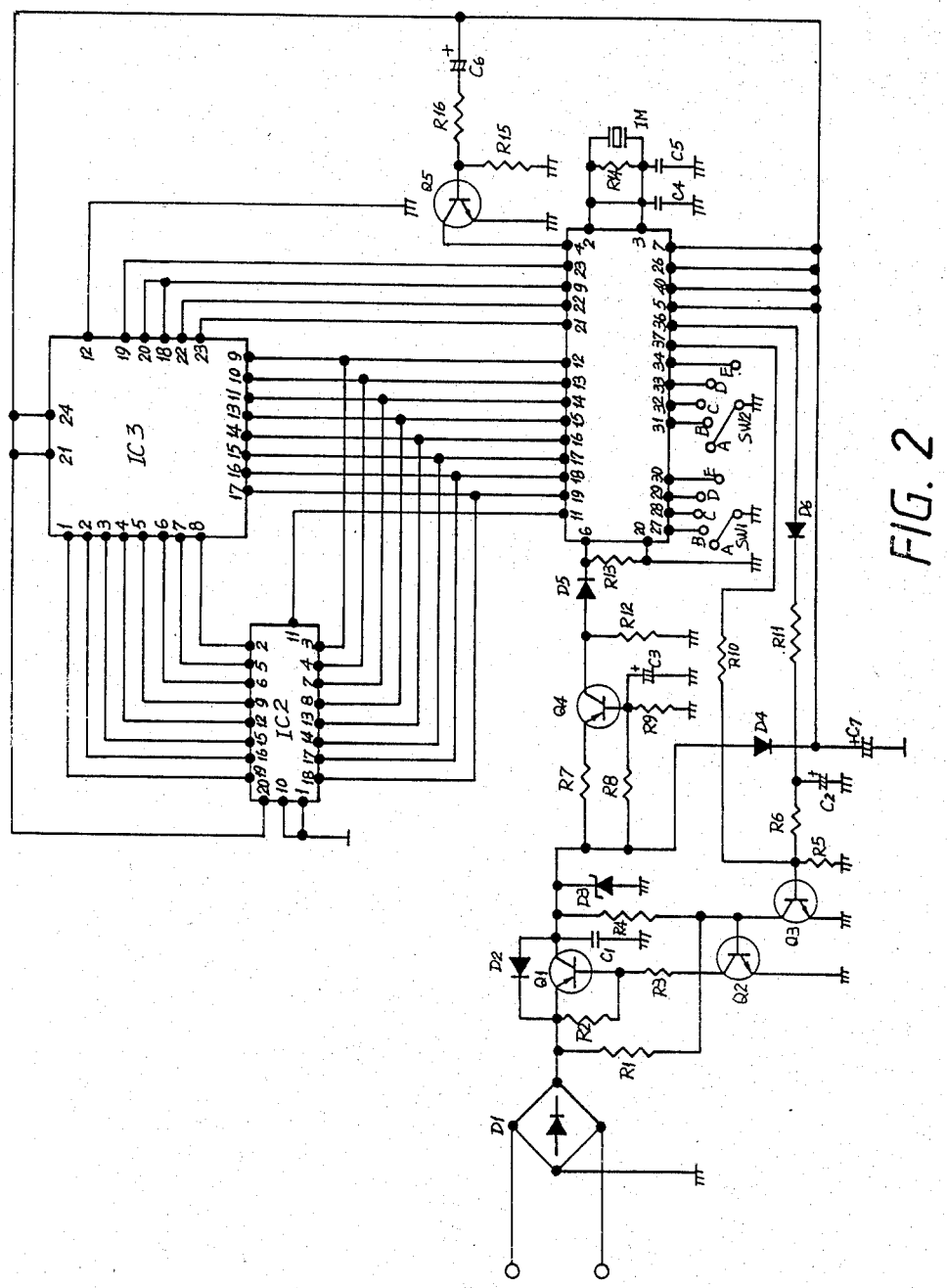
FIG. 2 is the schematic diagram of the embodiment in the present invention.

In the present invention, one of the two conventional telephone lines is in an open-circuit state; then, the two open contacts are connected to the input point of the present invention as shown in A and B in FIG. 2.

In the present invention, $IC_1$, $IC_2$, and $IC_3$ consume little power, which would not affect the dialing or talking operation of the telephone set; no power will be consumed when those ICs are not in use.

A and B in FIG. 2 are the power supply contacts of the telephone set. Thru D1 (a bridge rectifier), the A.C. power is rectified into D.C.; the converter circuit includes Q1, $R_1$, $R_2$, and $C_1$; D2 is used for stabilizing the voltage of the various circuits.

Upon the telephone set being dialed, a signal will be coupled to the pulse detection circuit from the converter circuit, and the pulse detection circuit includes $R_7$, $R_8$, $R_9$, $R_{12}$, $Q_4$ and $C_3$, and the output from that circuit is delivered to the 6th pin of $IC_1$ (micro processor unit). That 6th pin of $IC_1$ is used for identifying the wave width and PPS by generating a "yes" or "no" signal to be delivered into the micro processor unit for a series of operations. The pins 2 and 3 of $IC_1$ are connected to a crystal oscillating at a frequency of 3.579545 MHZ so as to have the $IC_1$ operation more stabilized. In the present invention, IC 80C48 or 80C35 may be used as the embodiment of the micro processor unit. The pins 27 to 30 of $IC_1$ are used for time control, being furnished with $SW_1$.

The pins 31 to 34 of $IC_1$ are used for dialing control, being furnished with $SW_2$.

Since IC 80C48 or 80C35 may be used as the microprocessor in the present invention, it needs one EPROM (Read only memory) and one AD-Latch so as to use $IC_2$ to latch the output signal from $IC_1$ (micro processor unit); then, let $IC_3$ (Read only memory) deliver the software data or information output to the micro processor unit ($IC_1$) for executing the instructions. The present invention may use other types of ICs to have all the data programs of $IC_1$, $IC_2$, and $IC_3$ stored.

In FIG. 2, $SW_1$ is a time control switch, in which point A stands for no time limit; point B stands for one minute; point C stands for two minutes; point D stands for three minutes; point E stands for four minutes. Of course, the time gradients may be varied in accordance with the requirement. If this invention has to be designed for stageless time control in accordance with the requirement, it may be done by merely modifying part of the software program and by adding one IC 555 for timing means.

SW$_2$ is a dialing control switch, in which point A stands for unable to dail the telephone number; point B stands for dialing three digits, such as dialing fire brigade, time calibration or the inter-telephone in the same building; point C stands for dialing a number under 17 digits within city area, such as three or seven digits but not for the trunk call (over seven digits); naturally, if the telephone number within a city consists of five or six digits, it may also be used. Point D stands for 11 digits, which can be used for dialing trunk call, fire brigade, and inter-telephone in the same building, but not for dialing international trunk call. Point E stands for non-limited digits, i.e., it may be used for dialing international trunk call, domestic trunk call, city area call, emergency call, etc. Of course, the number of digits may be designed in accordance with the requirement.

Operation Steps

When SW$_1$ is set at point B for one minute, and SW$_2$ is set at point C for dialing city area, time is counted upon picking up the hand-set; as soon as the one-minute time is almost up, about 20 seconds being left, the 37th pin of IC$_1$ will generate an warning signal. Upon the one-minute time being up, the 36th pin of IC$_1$ will send out a signal passing thru D$_6$, R$_{11}$, R$_6$, R$_5$, C$_2$ to have the base of Q$_3$ become "H" potential; now, Q$_3$ begins to operate. Upon Q$_3$ operating, the base of transistor Q$_2$ will drop and Q$_2$ becomes off state when transmitter Q$_2$ is turned off, the base of transmitter Q$_1$ is no longer connected to ground. Since Q$_1$ base is connected to Q$_1$ emitter, when Q$_1$ base is disconnected from ground, Q$_1$ is turned off. The impedance of the output of D$_1$ will become high and the circuit will be open between A and B.

If SW$_1$ is set at point A, the 36th pin of IC$_1$ has no output, but the 37th pin of IC$_1$ will generate a warning signal every three minutes automatically.

I claim:

1. A telephone control device for restricting dialing and time limiting telephone calls comprising:
   a full-wave rectifier adapted for connection to a telephone set for receiving a dialing signal and telephone power therefrom;
   a converter circuit, connected to said full-wave rectifier, for (1) converting said dialing signal into a pulse, (2) converting said telephone power into power usable by the device, and (3) receiving a cut-off signal which cuts off use of the telephone set;
   a pulse detector circuit, connected to said converter circuit, for receiving said pulse and generating a decoded signal;
   a microprocessor, connected to said pulse detector circuit, for receiving said decoded signal and determining whether a predetermined period of time has elapsed since the beginning of the dialing signal or a predetermined number of dialing digits has been exceeded during dialing of the telephone set whereupon said microprocessor generates a control signal to cut off the telephone set;
   first switch means, connected to said microprocessor for setting the predetermined period of time during which the telephone set may be used;
   second switch means, connected to said microprocessor, for setting the predetermined number of digits which may be dialed from said telephone set;
   memory means, connected to said microprocessor, for storing program instruction for said microprocessor;
   an A/D latch circuit, connected to said microprocessor and to said memory means, for controlling the transfer of information from said memory means to said microprocessor;
   a controller circuit for receiving said control signal from said microprocessor and generating said cut-off signal and transmitting it to said converter circuit; and
   a power collector circuit, connected to said converter, for providing usable power to said microprocessor, said AD latch circuit, and said memory means.

2. A device according to claim 1 wherein said predetermined period of time is infinite and the microprocessor does not generate a control signal for cutting off the telephone set and wherein said microprocessor generates a warning signal each time a preselected period of time has elapsed since the beginning of said dialing signal, said warning signal being transmitted through said controller circuit and said converter circuit so as to be audible to a user at said telephone.

3. A device according to claim 1, wherein said first switch means includes a device which provides a variety of predetermined periods of time from which said predetermined period of time may be selected.

4. A device according to claim 3 wherein said microprocessor generates a warning signal at a pre-chosen period of time before said predetermined period of time has elapsed, said warning signal being transmitted through said controller circuit and said converter circuit so as to be audible to a user at said telephone set.

5. A device according to claim 1 wherein said second switch means includes a device which provides a variety of predetermined numbers of digits from which said predetermined number of digits may be selected.

6. A device according to claim 1 wherein said microprocessor, said memory means and said A/D latch circuit are embodied in a single integrated circuit.

* * * * *